(12) United States Patent
Butti et al.

(10) Patent No.: US 12,330,612 B2
(45) Date of Patent: Jun. 17, 2025

(54) METHOD FOR CONTROLLING A FORCE REPRESENTATIVE OF A PARKING BRAKING OF A VEHICLE AND SYSTEM THEREOF

(71) Applicant: BREMBO S.P.A., Curno (IT)

(72) Inventors: Andrea Butti, Curno (IT); Corrado Manzoni, Curno (IT); Stefano Dossi, Curno (IT); Alfonso Tarantini, Curno (IT); Luca Cappelletti, Curno (IT)

(73) Assignee: Brembo S.p.A., Bergamo (IT)

( * ) Notice: Subject to any disclaimer, the term of this patent is extended or adjusted under 35 U.S.C. 154(b) by 0 days.

(21) Appl. No.: 18/763,013

(22) Filed: Jul. 3, 2024

(65) Prior Publication Data
US 2024/0351563 A1 Oct. 24, 2024

Related U.S. Application Data

(63) Continuation of application No. 16/465,715, filed as application No. PCT/IB2017/057447 on Nov. 28, 2017, now abandoned.

(30) Foreign Application Priority Data

Dec. 2, 2016 (IT) ................ 102016000122392

(51) Int. Cl.
*B60T 8/17* (2006.01)
*B60T 1/06* (2006.01)
(Continued)

(52) U.S. Cl.
CPC ................ *B60T 8/17* (2013.01); *B60T 1/065* (2013.01); *B60T 8/171* (2013.01); *B60T 8/172* (2013.01);
(Continued)

(58) Field of Classification Search
CPC . B60T 8/17; B60T 1/065; B60T 8/171; B60T 8/172; B60T 13/12; B60T 13/588;
(Continued)

(56) References Cited

U.S. PATENT DOCUMENTS 5,067,778 A * 11/1991 Testardi ................... B60T 8/00
303/119.2
6,249,735 B1 * 6/2001 Yamada ................ B60W 10/18
701/65
(Continued)

FOREIGN PATENT DOCUMENTS

| DE | 102005046015 A1 | 4/2006 |
| DE | 102011004772 A1 | 8/2012 |

(Continued)

*Primary Examiner* — Naeem Taslim Alam
(74) *Attorney, Agent, or Firm* — Marshall & Melhorn, LLC

(57) ABSTRACT

A method for controlling a force representative of a parking braking of a vehicle, having the steps of: determining, by a data processing unit, a target value of a force representative of a parking braking of the vehicle to be applied, by a first brake caliper,
on a first brake disc on the basis of a value of the gradient of the road on which the vehicle is located; determining, by the data processing unit, a value of a first force contribution representative of a service braking of the vehicle applied by a first hydraulic actuator on the first brake disc;
determining, by the data processing unit, a value of a second force contribution representative of the parking braking of the vehicle to be applied, by a second electromechanical actuator, on the first brake disc on
(Continued)

the basis of a target value of a force representative of a parking braking of the vehicle which can be applied by the first brake caliper on the first brake disc, and of the determined value of the first force contribution representative of a service braking of the vehicle; operating, by the data processing unit, the second electromechanical actuator to apply the determined value of the second force contribution representative of the parking braking of the vehicle on the first brake disc.

7 Claims, 5 Drawing Sheets

(51) Int. Cl.
| | |
|---|---|
| *B60T 8/171* | (2006.01) |
| *B60T 8/172* | (2006.01) |
| *B60T 13/12* | (2006.01) |
| *B60T 13/58* | (2006.01) |
| *B60T 13/66* | (2006.01) |
| *B60T 13/74* | (2006.01) |

(52) U.S. Cl.
CPC ............ *B60T 13/12* (2013.01); *B60T 13/588* (2013.01); *B60T 13/662* (2013.01); *B60T 13/746* (2013.01); *B60T 2270/10* (2013.01); *B60T 2270/30* (2013.01)

(58) Field of Classification Search
CPC .. B60T 13/662; B60T 13/746; B60T 2270/10; B60T 2270/30
See application file for complete search history.

(56) References Cited

U.S. PATENT DOCUMENTS

| | | | | |
|---|---|---|---|---|
| 2006/0267402 | A1* | 11/2006 | Leiter | B60T 13/741 303/20 |
| 2006/0273658 | A1* | 12/2006 | Halassy-Wimmer | B60T 13/746 303/191 |
| 2008/0149437 | A1* | 6/2008 | Herges | B60T 17/221 188/138 |
| 2010/0072811 | A1* | 3/2010 | Kondo | B60T 13/741 303/20 |
| 2011/0153147 | A1* | 6/2011 | Watanabe | F16D 65/18 188/72.4 |
| 2012/0292139 | A1* | 11/2012 | Hanzawa | B60T 13/741 188/72.3 |
| 2013/0138316 | A1* | 5/2013 | Koyama | B60T 8/1755 701/70 |
| 2016/0214610 | A1* | 7/2016 | Kotsuji | B60W 30/18 |
| 2016/0272180 | A1* | 9/2016 | Morimura | B60T 8/885 |
| 2017/0066425 | A1* | 3/2017 | Kim | B60Q 9/002 |
| 2017/0232849 | A1* | 8/2017 | Yamamoto | B60T 8/267 303/15 |
| 2017/0349154 | A1* | 12/2017 | Ryu | B60T 8/172 |
| 2019/0176790 | A1* | 6/2019 | Urano | B60T 13/662 |
| 2020/0324751 | A1 | 10/2020 | Englert et al. | |

FOREIGN PATENT DOCUMENTS

| | | |
|---|---|---|
| DE | 102014222197 A1 | 5/2016 |
| DE | 102015206034 A1 | 10/2016 |
| GB | 2499696 A | 8/2013 |
| WO | 2010146158 A2 | 12/2010 |
| WO | 2012080023 A1 | 6/2012 |
| WO | 2012152350 A1 | 11/2012 |
| WO | 2012175468 A1 | 12/2012 |
| WO | 2015036393 A1 | 3/2015 |

* cited by examiner

METHOD FOR CONTROLLING A FORCE REPRESENTATIVE OF A PARKING BRAKING OF A VEHICLE AND SYSTEM THEREOF

FIELD OF THE INVENTION

The present invention relates to a method for controlling a force representative of a parking braking of a vehicle and to a system thereof.

BACKGROUND

Over the last few years, with the development and spreading of electric parking systems for vehicles, the rapid spreading of so-called combined brake calipers within braking systems for vehicles, has been witnessed.

Such a type of brake caliper, which is usually installed on the wheel sides on which the presence of the parking brake is required, in a single mechanical component, is adapted to receive an inlet hydraulic pressure which can be applied on a hydraulic piston inside the brake caliper, for actuating the service braking, and it further comprises an electromechanical actuator for actuating the parking braking.

The hydraulic piston for actuating the service braking is operated due to the effect of the hydraulic pressure applied within the service braking system of the vehicle by the driver of the vehicle by means of the brake pedal or other systems (such as for example, the ABS system, the ESC system or the i-booster system) which are responsible for ensuring the stability or the autonomous driving of the vehicle.

The electromechanical actuator for actuating the parking braking instead is operated by an electronic control unit for controlling the electric parking system of the vehicle upon a command imparted by the driver of the vehicle or generated in an automatic manner.

Thus, the force resulting from the contact between the combined brake caliper and the brake disc is given by the sum of the force contribution of the hydraulic pressure generated by the hydraulic piston (service braking) and the force contribution of the electromechanical actuator (parking braking).

This is due to the fact that the combined brake caliper typically is designed to ensure the mechanical irreversibility of the force contribution of the electromechanical actuator for the parking braking. Thus, once the force contribution of the electromechanical actuator is applied, the force contribution of the hydraulic pressure generated by the hydraulic piston is not released when the hydraulic pressure is removed.

Indeed, according to this manner for controlling the parking braking, the electromechanical actuator is controlled by the electronic control unit so as to ensure the force contribution for actuating the parking braking of the vehicle independently of the force contribution applied for actuating the service braking.

This is a drawback because in order to resist with difficulty to the sum of the force contribution of the hydraulic pressure generated by the hydraulic piston and of the force contribution of the electromechanical actuator, the combined brake caliper necessarily is to be oversized.

Such an oversizing certainly is a disadvantage because it results both in an increase of the weight and sizes and inevitably an increase of the costs of the combined brake caliper and of the performance of the electromechanical actuator.

SUMMARY

It is the object of the present invention to devise and make available a method for controlling a force representative of a parking braking of a vehicle which allows at least partially obviating the drawbacks indicated above with reference to the known art.

Such an object is achieved by a method according to claim 1.

An object of the present invention is also a system for controlling a force representative of a parking braking of a vehicle.

BRIEF DESCRIPTION OF THE FIGURES

Further features and advantages of the method and of the system thereof according to the invention will become apparent from the following description of preferred embodiments thereof, given only by way of non-limiting, indicative example, with reference to the accompanying drawings, in which.

DETAILED DESCRIPTION

Figure 1:
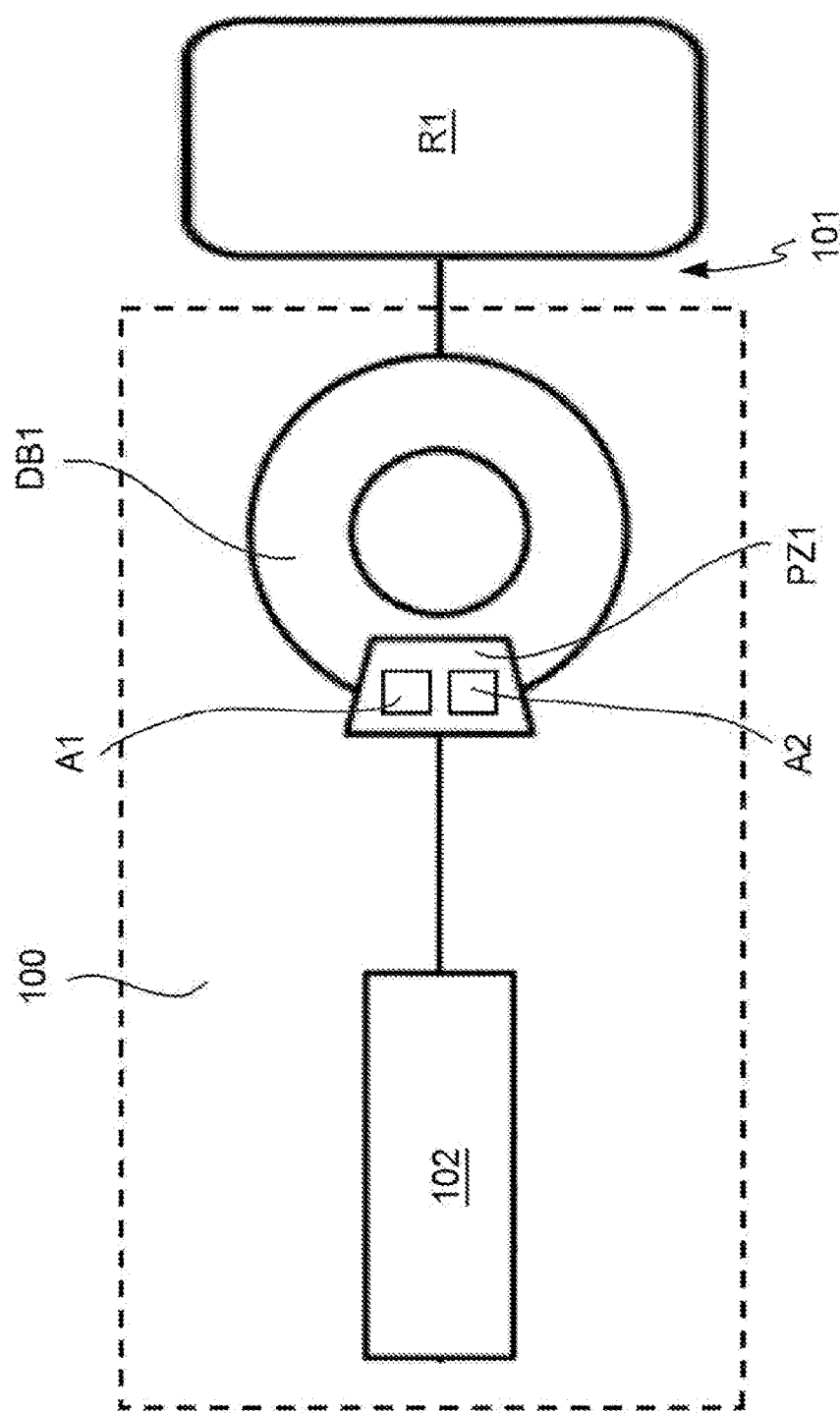
FIG. 1 shows by means of a block diagram an electronic system for controlling a force representative of a parking braking of a vehicle according to one embodiment of the invention.

With reference to FIG. 1, a system 100 for controlling a force representative of a parking braking of a vehicle is now described, hereinafter also only control system or simply system, according to one embodiment of the present invention.

It is worth noting that equal or similar elements in the drawings are indicated with the same reference numbers.

The vehicle, of which only a portion is schematically shown in FIG. 1, is indicated as a whole with the reference number 101.

It is worth noting that the vehicle 101 is for example, a four-wheel vehicle. However, such a vehicle could also be a two- or three-wheel motor vehicle or a vehicle with more than four wheels.

With reference to the embodiment in FIG. 1, the vehicle 101 comprises at least one first wheel R1 and the system 100 for controlling a force representative of a parking braking of the vehicle 101.

The system 100 comprises a first brake disc DB1 operatively associated with said at least one first wheel R1.

The system 100 further comprises a first brake caliper PZ1 operatively associated with said at least one first brake disc DB1.

The first brake caliper PZ1 can be operated to apply a force representative of a parking braking on the first brake disc DB1.

In greater detail, the first brake caliper PZ1 is adapted to receive a hydraulic pressure which can be applied by a first hydraulic actuator A1 that can be operated to apply a first force contribution representative of a service braking of the vehicle on the first brake disc DB1.

The first hydraulic actuator A1, e.g. a hydraulic piston (schematically illustrated in FIG. 1), is inside the first brake caliper PZ1.

The operation of the first hydraulic actuator A1 may be obtained by means of the pressure, by the driver of the vehicle 101, of a brake pedal (not shown in FIG. 1) with which the vehicle 101 is provided.

The first brake caliper PZ1 comprises a second electromechanical actuator A2 that can be operated to apply a second force contribution representative of a parking braking of the vehicle 101 on the first brake disc DB1.

Thus, the force representative of the parking braking which can be applied by the first brake caliper DB1 comprises the first force contribution representative of the service braking of the vehicle which can be applied by the first hydraulic actuator A1 and the second force contribution representative of the parking braking of the vehicle 101 which can be applied by the second electromechanical actuator A2.

The system 101 further comprises a data processing unit 102, for example a microprocessor or a microcontroller, and a respective storage unit, operatively connected to the first brake caliper DB1.

The second electromechanical actuator A2 is operatively connected to the data processing unit 102.

In particular, the data processing unit 102 is configured to operate the second electromechanical actuator A2.

According to one embodiment, the data processing unit 102 is configured to operate the second electromechanical actuator A2 following the receipt of a command for operating the parking brake which can be operated by the driver of the vehicle 101.

It is worth noting that the command for operating the parking brake (not shown in FIG. 1) which can be operated by the driver of the vehicle 101 may be a lever selector or a button.

According to another embodiment, the data processing unit 102 is configured to operate the second electromechanical actuator A2 on the basis of an automatic control generated by the data processing unit 102 itself according to one or more signals representative of the monitoring of the movement of the vehicle 101, for example a signal representative of the monitoring of the accelerator pedal, a signal representative of the status of the thermal engine, and so on.

Moreover, the data processing unit 102 is configured to execute a method for controlling a force representative of a parking braking of the vehicle 101 according to the present invention, described in detail later.

To this end, the data processing unit 102 is configured to load and execute one or more program codes stored in the respective storage unit in order to execute the steps of the aforesaid method.

The storage unit is also configured to store the data processed by the data processing unit 102 during the execution of the aforesaid method by the data processing unit 102.

It is worth noting that the data processing unit 102 preferably is an electronic control unit.

According to one embodiment, the electronic control unit is dedicated at least to control the second electromechanical actuator A2.

According to a further embodiment, the electronic control unit is dedicated to control one or more electromechanical actuators.

According to a further embodiment, the electronic control unit may be peripheral and may be operatively connected to a central electronic control unit (not shown in FIG. 1) with which the vehicle 101 is provided.

Returning to FIG. 1, it is worth noting that as already indicated above, such a drawing only shows a portion of the vehicle 101.

In particular, for brevity of description, in addition to the aforesaid system 100, the vehicle 101 is described as comprising said at least one first wheel R1.

The at least one first wheel R1 is any one wheel of the vehicle 101 belonging to the wheel side (front or rear) on which the parking brake is provided.

To this end, if the parking brake is provided on the front side of the vehicle 101, said at least one first wheel R1 could be the front wheel of the vehicle 101 (right or left, in the case of a vehicle with four or more wheels).

If the parking brake were provided on the rear side of the vehicle 101, said at least one first wheel R1 could be a rear wheel of the vehicle 101 (right or left, in the case of a vehicle with four or more wheels).

It is worth noting that in the event of a vehicle with four or more wheels, the vehicle 101 further comprises at least one second wheel (not shown in FIG. 1) operatively connected to the system 100 for controlling the parking braking of the vehicle 101.

In this case, the system 100 further comprises a second brake disc operatively associated with said at least one second wheel.

The system 100 further comprises a second brake caliper operatively associated with said at least one second brake disc.

The second brake caliper is entirely similar to the first brake caliper PZ1 described above, i.e. it is capable of applying a force representative of a parking braking of the vehicle 101 on the second brake disc.

In greater detail, the second brake caliper is adapted to receive a hydraulic pressure which can be applied by a respective first hydraulic actuator that can be operated to apply a second force contribution representative of a service braking of the vehicle on the second brake disc.

The second hydraulic actuator, e.g. a hydraulic piston, is inside the second brake caliper.

The operation of the second hydraulic actuator may be obtained by means of the pressure, by the driver of the vehicle 101, of the brake pedal with which the vehicle 101 is provided.

The second brake caliper comprises a respective second electromechanical actuator that can be operated to apply a second force contribution representative of a parking braking of the vehicle 101 on the second brake disc.

The second electromechanical actuator of the second brake caliper is operatively connected to the data processing unit 102.

Also in this case, the data processing unit 102 is configured to operate the second electromechanical actuator of the second brake caliper according to the manners (manual or automatic) described above with reference to the operation, by the data processing unit 102, of the second electromechanical actuator A2 of the first brake caliper PZ1.

It is also worth noting here that the data processing unit 102 is configured to execute the method for controlling a force representative of a parking braking of the vehicle 101 also on said at least one second wheel. In particular, in one embodiment, the data processing unit 102 is configured to acquire a first electrical signal representative of the longitudinal acceleration of the vehicle 101 (for example, by means of the use of a specific sensor, such as an inertial platform) and a second electrical signal representative of the angular speed of said at least one first wheel R1 (for example, by means of the use of a specific sensor installed on the wheel, preferably on the hub of the wheel).

Moreover, according to one embodiment, the data processing unit 102 is configured to continuously detect the hydraulic pressure in the service braking system of the vehicle 101.

It is worth noting that the detection of the hydraulic pressure in the service braking system of the vehicle 101 may be obtained by means of the use of one or more sensors distributed within the braking system or by means of the execution, by the data processing unit 102, of a calculation model based on indirect information such as the hydraulic pressure inlet to the allocation system of the brake system and other information.

Moreover, according to one embodiment, the data processing unit 102 is configured to detect, by means of specific sensors installed therein, quantities representative of operating parameters of the system 100 during the use thereof that can be used during the execution of the aforesaid method, such as an electric voltage value of the electric supply battery of the vehicle 101, an ambient temperature value, a value representative of the electric voltage and of the electric current of the second electromechanical actuator A2 of the first brake caliper PZ1.

It is worth noting that the detection of such quantities may be obtained by means of using specific sensors installed on the electronic board comprising the data processing unit 102 (e.g. electric voltage sensors or electric current sensors) or by means of using sensors external to the aforesaid electronic board (e.g. temperature sensors).

Figure 2:
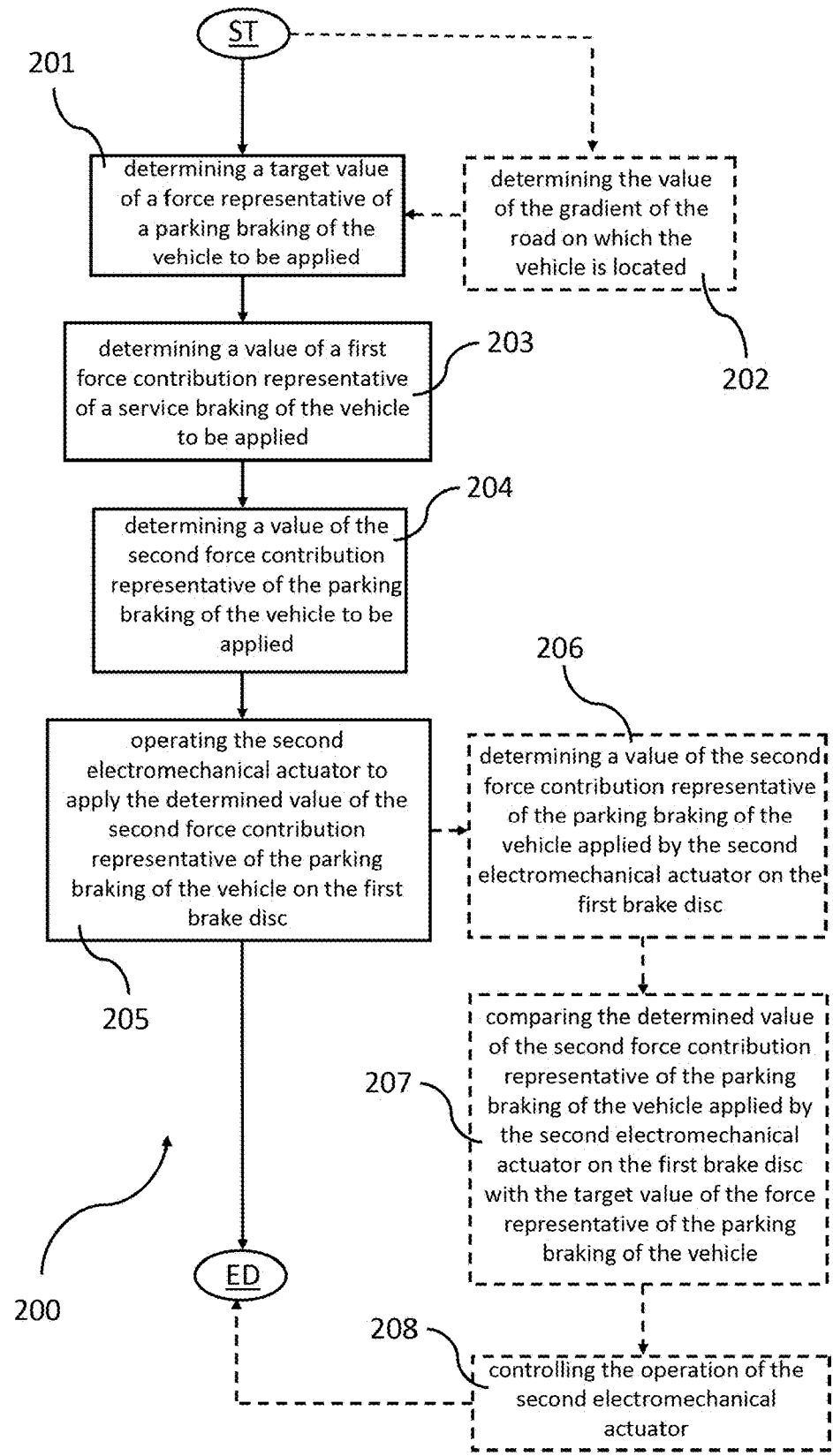
FIG. 2 shows by means of a block diagram a method for controlling a force representative of a parking braking of a vehicle according to one embodiment of the invention.

Referring now also to FIG. 2, a method 200 for controlling a force representative of the parking braking of a vehicle 101 is now described.

It is reiterated that the vehicle 101 comprises at least one first wheel R1 and a system 100 for controlling a force representative of a parking braking of the vehicle 101.

The system 101 comprises:

a first brake disc DB1 operatively associated with said at least one first wheel R1;

a first brake caliper PZ1 operatively associated with said at least one first brake disc DB1, the first brake caliper DB1 being configured to exert a force representative of a parking braking of the vehicle 101 on the first brake disc DB1.

The first brake caliper PZ1 is adapted to receive a hydraulic pressure which can be applied by a first hydraulic actuator A1 that can be operated to apply a first force contribution representative of a service braking of the vehicle on the first brake disc DB1.

The first brake caliper PZ1 comprises a second electromechanical actuator A2 that can be operated to apply a second force contribution representative of a parking braking of the vehicle 101 on said first brake disc DB1.

The system 100 further comprises a data processing unit 102 operatively connected to the first brake caliper DB1.

With reference to FIG. 2, the method comprises a symbolic step of starting ST.

The method 200 further comprises a step of determining 201, by the data processing unit 102, a target value of a force representative of a parking braking of the vehicle to be applied, by the first brake caliper PZ1, on the first brake disc DB1 on the basis of a value of the gradient of the road on which the vehicle is located.

The target value of the force FT representative of a parking braking may be obtained by using for example, the following formula:

$$FT = K * \sin(\arctan(\text{gradient}))$$

where K is a coefficient whose value depends on the weight of the vehicle 101, on the effective radius of the brake disc, on the friction coefficient between pad and brake disc, on the radius of the wheel.

In one embodiment, shown with a dotted line in FIG. 2, the method 200 further comprises a step of determining 202, by the data processing unit 102, the value of the gradient of the road on which the vehicle 101 is located on the basis of a first electrical signal representative of the longitudinal acceleration of the vehicle 101 and/or of a second electrical signal representative of the angular speed of said at least one first wheel DB1 acquired by the data processing unit 102.

The gradient of the road may be determined for example, starting from the longitudinal acceleration of the vehicle 101 by means of the following formula indicated below, or by a mathematical simplification thereof indicated in the successive formula (that can be used for small angles):

$$\text{Gradient} = \tan\left(\arcsin\left(\frac{Acc\_long\_veic}{g}\right)\right)$$

or $$\text{Gradient} = \tan\left(\arcsin\left(\frac{Acc\_long\_veic}{g}\right)\right) = \arcsin\left(\frac{Acc\_long\_veic}{g}\right) = \frac{Acc\_long\_veic}{g}$$

where "Acc_long_veic" is the longitudinal acceleration of the vehicle.

Returning to the embodiment of FIG. 1, the method 200 further comprises a step of determining 203, by the data processing unit 102, a value of a first force contribution HF representative of a service braking of the vehicle 101 applied by the first hydraulic actuator A1 on the first brake disc DB1.

It is worth noting that the value of a first force contribution HF representative of a service braking of the vehicle 101 (hydraulic pressure) may be calculated from a value of hydraulic pressure detected by a specific pressure sensor by means of using a mathematical calculation model or estimator using for example, the following formula:

$$HF = \text{pressure} * \text{Piston\_Area}$$

where: "pressure" is the hydraulic pressure detected by the pressure sensor; "Piston_Area" is the area of the hydraulic piston.

The method 200 further comprises a step of determining 204, by the data processing unit 102, a value of the second force contribution representative of the parking braking of the vehicle 101 to be applied, by the second electromechanical actuator A2, on the first brake disc DB1 on the basis of the target value of a force representative of a parking braking of the vehicle 101, and of the determined value of the first force contribution representative of a service braking of the vehicle 101.

It is worth noting that the value of a second force contribution EF representative of the parking braking may be determined for example by means of the following formula:

$$EF = FT - HF + FM$$

where: FT is the target value of the force representative of a parking braking; HF is the value of a first force contribution representative of a service braking; FM is the force margin due to the force fall at the removal of the hydraulic pressure.

Figure 4:
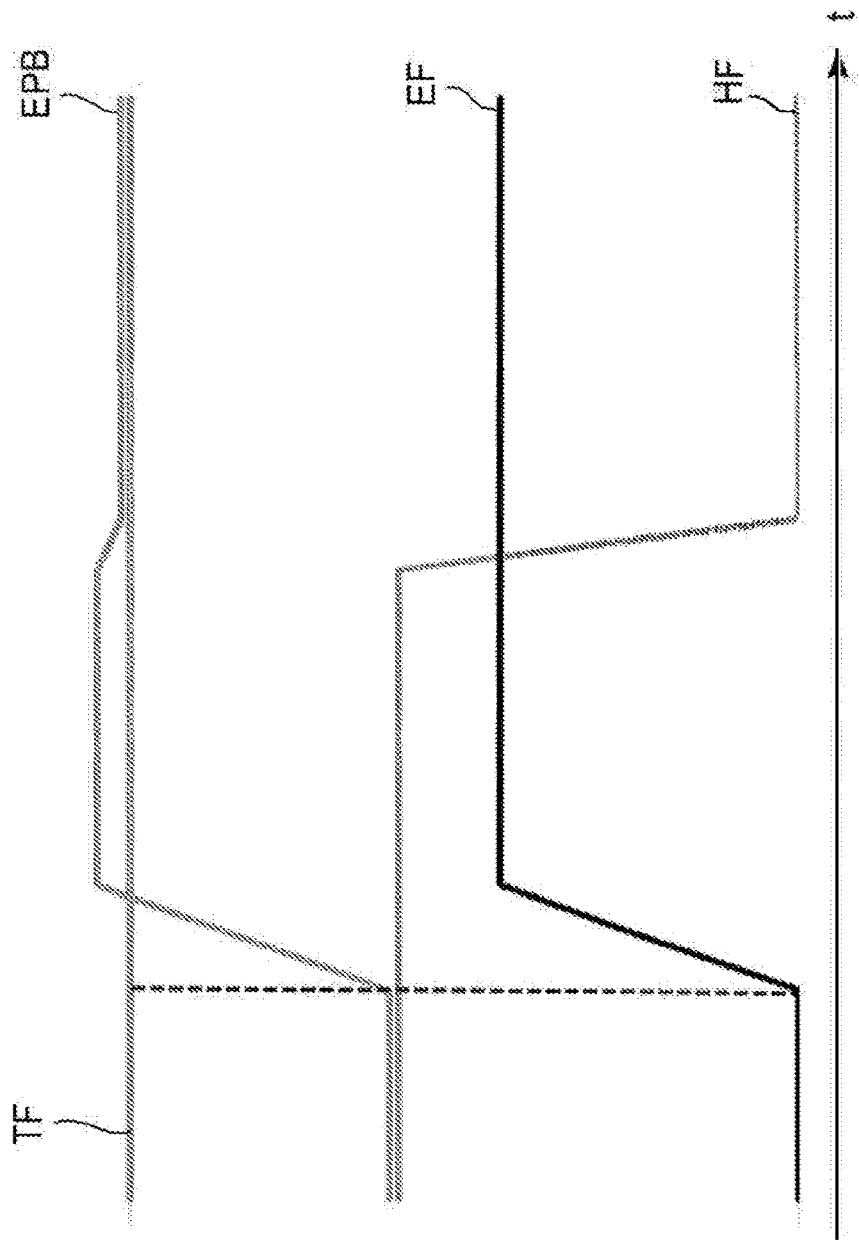

It is worth noting that an example of application of such a formula is shown in FIG. 4.

Figure 3:
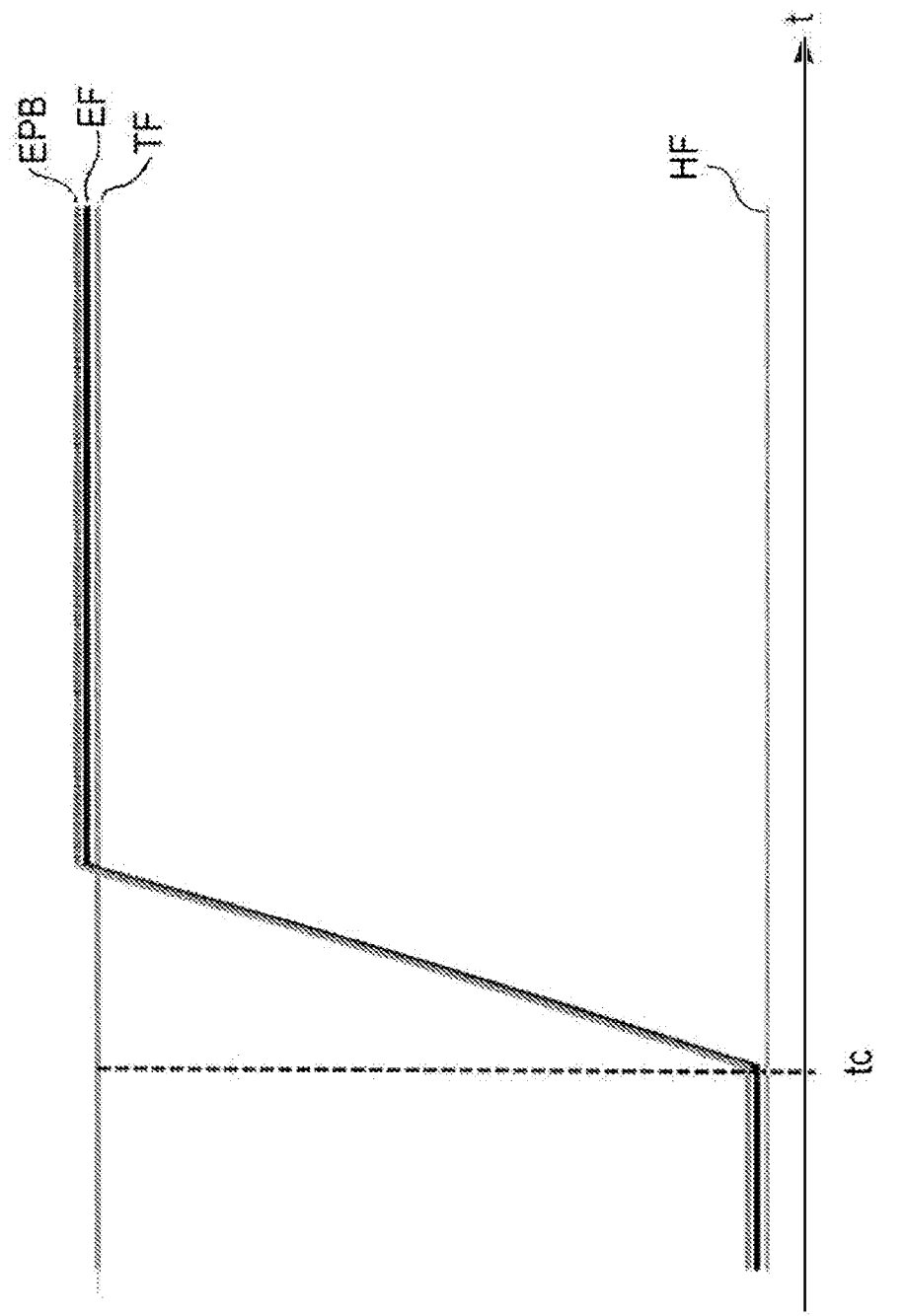
FIGS. 3 to 5 show by means of respective diagrams the trend of quantities according to a further embodiment of the invention.
Figure 5:
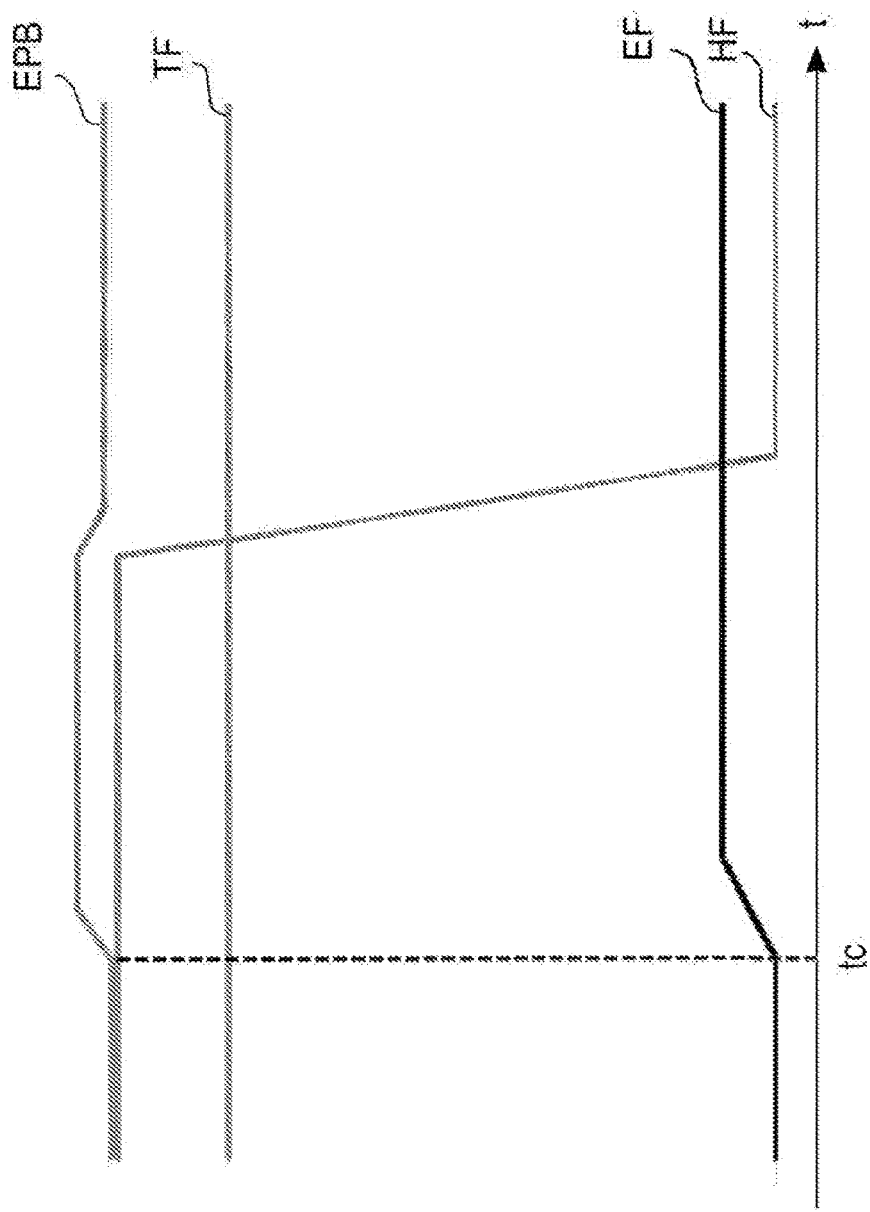

It is worth noting that the above-described step of determining 203 and the step of determining 204 are executed for example, by the data processing unit 102, in a continuous manner so as to have the estimate of the determined values always updated according to the pressure variations and on the basis of the application step (to this end, see the examples in FIGS. 3 to 5).

Returning again to the embodiment of FIG. 2, the method 200 further comprises a step of operating 205, by the data processing unit 102, the second electromechanical actuator A2 to apply the determined value of the second force contribution representative of the parking braking of the vehicle 101 on the first brake disc DB1.

To this end, the data processing unit 102 is configured to operate an electric motor (in direct current or in alternating current) operatively connected to the second electromechanical actuator A2.

The force applied by the second electromechanical actuator A2 may be estimated according to trends of the quantities of electric voltage and electric current of the electric motor.

The method 200 comprises a symbolic step of ending ED.

According to one embodiment (shown with dotted lines in FIG. 2), combined with any one of the ones described above, the method 200 further comprises a step of determining 206, by the data processing unit 102, a value of the second force contribution representative of the parking braking of the vehicle 101 applied by the second electromechanical actuator A2 on the first brake disc DB1 on the basis of quantities representative of operating parameters of the system 100 during the use thereof, which can be detected by the data processing unit 102.

It is worth noting that such quantities can be detected through specific sensors.

It is worth noting that also the step of determining 206 is executed in a continuous manner to always have an updated control.

In this embodiment, the method 200 further comprises a step of comparing 207, by the data processing unit 102, the determined value of the second force contribution representative of the parking braking of the vehicle 101 applied by the second electromechanical actuator A2 on the first brake disc DB1 with the target value of the force representative of the parking braking of the vehicle 101.

In this embodiment, the method 200 further comprises a step of controlling 208, by the data processing unit 102, the operation of the second electromechanical actuator A2 on the basis of the result of the step of comparing 207.

In particular, the electric motor (in direct current or in alternating current) operatively connected to the second electromechanical actuator A2 is controlled until the determined value of the second force contribution representative of the parking braking of the vehicle 101 applied by the second electromechanical actuator A2 on the first brake disc DB1 does not coincide with the target value of the force representative of the parking braking of the vehicle 101.

With reference to FIGS. 3 to 5, examples of executing the method 200 for controlling the parking braking of the vehicle 101 are now described.

Each of the FIGS. 3 to 5 is a Cartesian diagram indicating time (t) on the abscissas, and on the ordinates, the following quantities:

HF: value of the first force contribution representative of the service braking which can be applied by the first actuator A1 of the first brake caliper PB1 on the first brake disc DB1;

TF: target value of the force representative of the parking braking of the vehicle 101 which can be applied by the first brake caliper PZ1 on the first brake disc DB1;

EF: value of the second force contribution representative of the parking braking which can be applied by the second actuator A2 of the first brake caliper PZ1 on the brake disc DB1;

EPB: value of the force applied by the first brake caliper PZ1 on the first brake disc DB1.

Reference to in FIGS. 3 to 5 indicates the time instant when the method 200 for controlling the parking braking of the vehicle 101 according to the present invention is executed, i.e. the parking brake control is imparted by the driver of the vehicle 101.

In the example in FIG. 3, the value applied of the first force contribution HF representative of the service braking (hydraulic force) of the vehicle 101 is null.

In this case, the value of the second force contribution EF representative of the parking braking (electromechanical force) of the vehicle 101 is determined so as to alone satisfy the target value TF of the force representative of the parking braking of the vehicle 101 which can be applied by the first brake caliper PZ1 on the first brake disc DB1.

The force EPB representative of the parking braking of the vehicle 101 applied by the first brake caliper PZ1 on the first brake disc DB1 corresponds to the value of the second force contribution EF representative of the parking braking (electromechanical force) of the vehicle 101.

In the example in FIG. 4, the value applied of the first force contribution HF representative of the service braking (hydraulic force) of the vehicle 101 is not null. In this case, the value of the second force contribution EF representative of the parking braking (electromechanical force) of the vehicle 101 is determined so that the force EPB representative of the parking braking applied by the first brake caliper PZ1 on the first brake disc DB1 is equal to the target value TF of the force representative of the parking braking which can be applied by the first brake caliper PZ1 on the first brake disc DB1 considering the non-null value of the first force contribution HF representative of the service braking (hydraulic force).

It is worth noting that from the moment when the value of the first force contribution HF representative of the service braking becomes null (release of the hydraulic pressure within the brake system of the vehicle 101), the force EPB representative of the parking braking applied by the first brake caliper PZ1 on the first brake disc DB1 corresponds to the target value TF of the force representative of the parking braking which can be applied by the first brake caliper PZ1 on the first brake disc DB1.

This is due to the mechanical features of the brake caliper which changes its behavior according to the fact that there is pressure or there is no pressure (deformations and so on).

Moreover, it may be considered that the value of a second force contribution EF representative of the parking braking may be determined for example by means of the above-described formula EF=FT−HF+FM.

In the example of FIG. 5, the value applied by the first force contribution HF representative of the service braking (hydraulic force) of the vehicle 101 is equal to or greater than the target value TF of the force representative of the parking braking of the vehicle 101 which can be applied by the first brake caliper PZ1 on the first brake disc DB1.

In this case, the value of the second force contribution EF representative of the parking braking (electromechanical force) of the vehicle 101 is determined so as to ensure the mechanical irreversibility considering the non-null value of the first force contribution HF representative of the parking braking (hydraulic force), and to keep the force EPB representative of the parking braking applied by the first brake caliper PZ1 on the first brake disc DB1 equal to the target value TF of the force representative of the parking braking which can be applied by the first brake caliper PZ1 on the first brake disc DB1 also if the value of the first force contribution HF representative of the service braking (hydraulic force) of the vehicle 101 becomes null.

It is indeed worth noting that from the moment when the value of the first force contribution HF representative of the service braking of the vehicle 101 becomes null (release of the hydraulic pressure within the brake system of the vehicle 101), the force EPB representative of the parking braking applied by the first brake caliper DB1 on the first brake disc DB is equal to or greater than the target value TF of the force representative of the parking braking which can be applied by the first brake caliper PZ1 on the first brake disc DB1.

Indeed, once the second electromechanical actuator A2 comes into contact with the brake pad, the force is not released, due to the effect of the mechanical irreversibility of the second electromechanical actuator A2, also once the hydraulic pressure is released, because the brake pad does not return to the resting position (the brake pad attempts to move but is blocked by the second electromechanical actuator A2).

Thus, once the second electromechanical actuator A2 starts applying the force, the value of the force applied by the first brake caliper PZ1 on the first brake disc DB1 may only increase but cannot decrease.

It is worth noting that the value of the force applied by the first brake caliper PZ1 on the first brake disc DB1 naturally decreases if the second electromechanical actuator A2 is moved in release direction.

The method 200 and the system 100 thereof of the present invention have various advantages.

Firstly, through the method of the present invention, the second force contribution representative of the parking braking may be applied accurately also in the presence of hydraulic pressure, i.e. also in the presence of the first force contribution representative of the service braking of the vehicle, without overloading the mechanical component of the first brake caliper, thus facilitating the successive step of releasing the parking braking, therefore reducing the residual torque, also reducing the consumption of electric power.

The fact of applying the second force contribution representative of the parking braking (electromechanical force) according to the first force contribution representative of the service braking (hydraulic force due to the hydraulic pressure within the brake system of the vehicle) allows a minimum overall force to be obtained at contact between pad (mounted on the first brake caliper) and first brake disc, which overall force is required for parking without overloading and therefore oversizing the mechanical component. Thereby, the weight, the volumes and the cost of the mechanical components may be significantly reduced, and more relaxed performance of the electromechanical actuator may be obtained.

Moreover, the method of the present invention allows the second force contribution representative of the parking braking (electromechanical force) to be applied according to the first force contribution representative of the service braking (hydraulic force) already applied so as to reach the target value of force representative of the parking braking of the vehicle without inducing an excessive stress from the mechanical viewpoint.

Those skilled in the art may make several changes and adaptations to the above-described embodiments of the method and system thereof, and may replace elements with others which are functionally equivalent in order to meet contingent needs, without departing from the scope of the following claims. Each of the features described as belonging to a possible embodiment may be achieved irrespective of the other embodiments described.

What is claimed is:

1. A method for controlling a force representative of a parking braking of a vehicle, the vehicle comprising at least one first wheel and a system for controlling the parking braking of the vehicle, the system comprising:

a first brake disc operatively associated with said at least one first wheel;

a first brake caliper operatively associated with said first brake disc, the first brake caliper being configured to apply the force representative of the parking braking on said first brake disc, said first brake caliper being adapted to receive a hydraulic pressure which can be applied by a first hydraulic actuator that can be operated to apply a first force contribution representative of a service braking of the vehicle on said first brake disc, said first brake caliper comprising a second electromechanical actuator, which can be operated to apply a second force contribution representative of the parking braking of the vehicle on said first brake disc;

a data processing unit operatively connected to the first brake caliper;

the method comprising steps of:

determining, by the data processing unit, a target value of the force representative of the parking braking of the vehicle to be applied, by the first brake caliper, on the first brake disc on a basis of a value of a gradient of a road on which the vehicle is located;

determining, by the data processing unit, a value of the first force contribution representative of the service braking of the vehicle applied by the first hydraulic actuator on the first brake disc;

determining, by the data processing unit, a value of the second force contribution representative of the parking braking of the vehicle to be applied, by the second electromechanical actuator, on the first brake disc on a basis of the target value of the force representative of the parking braking of the vehicle which can be applied by the first brake caliper on the first brake disc, and on a basis of the determined value of the first force contribution representative of the service braking of the vehicle, the value EF of the second force contribution representative of the parking braking being calculated from the target value FT of the force representative of the parking braking, the value HF of the first force contribution representative of the service braking and also on a basis of a force margin FM due to a force fall at a removal of the hydraulic pressure by the formula FT-HF+FM; and operating, by the data processing unit, the second electromechanical actuator to apply the determined value of the second force contribution representative of the parking braking of the vehicle on the first brake disc;

further comprising a step of comparing, by the data processing unit, the determined value of the second force contribution representative of the parking braking of the vehicle applied by the second electromechanical actuator on the first brake disc with the target value of the force representative of the parking braking of the vehicle which can be applied by the first brake caliper on the first brake disc; and further comprising a step of controlling, by the data processing unit, the operation of the second electromechanical actuator on a basis of a result of the step of comparing.

2. The system according to claim 1, wherein the vehicle further comprises at least one second wheel, the system further comprising:

a second brake disc operatively associated with said at least one second wheel;

a second brake caliper operatively associated with said second brake disc, the second brake caliper being configured to apply a force representative of the parking braking of the vehicle on the second brake disc, the second brake caliper being adapted to receive a hydraulic pressure which can be applied by a third hydraulic actuator, which can be operated to apply a third force contribution representative of the service braking of the vehicle on the second brake disc, the second brake caliper comprising a respective fourth electromechanical actuator that can be operated to apply a fourth force contribution representative of the parking braking of the vehicle on the second brake disc, the data processing unit being operatively connected to the second brake caliper, the data processing unit being configured to perform on said at least one second wheel the steps of:

determining a target value of a force representative of the parking braking of the vehicle to be applied, by the second brake caliper, on the second brake disc on the basis of the value of the gradient of the road on which the vehicle is located;

determining a value of the third force contribution representative of the service braking of the vehicle applied by the third hydraulic actuator on the second brake disc;

determining a value of the fourth force contribution representative of the parking braking of the vehicle to be applied, by the fourth electromechanical actuator, on the second brake disc on a basis of the target value of the force representative of the parking braking of the vehicle which can be applied by the second brake caliper on the second brake disc, and on a basis of the determined value of the third force contribution representative of the service braking of the vehicle; and operating the fourth electromechanical actuator to apply the determined value of the fourth force contribution representative of the parking braking of the vehicle on the second brake disc.

3. The method according to claim 1, wherein the value of the first force contribution HF representative of a service braking of the vehicle being calculated from a value of hydraulic pressure detected by a pressure sensor and a value of an area of the hydraulic piston by the formula HF=hydraulic pressure×piston area.

4. The method of claim 1, wherein the target value is further determined on the basis of a coefficient whose value depends on the weight of the vehicle, and on an effective radius of the first brake disc, and on a friction coefficient between a pad and the first brake disc and on a radius of the at least one first wheel.

5. The method according to claim 4, further comprising a step of determining, by the data processing unit, the value of the gradient of the road on which the vehicle is located on a basis of a first electrical signal representative of a longitudinal acceleration of the vehicle and a second electrical signal representative of an angular speed of said at least one first wheel.

6. The method of claim 4, further comprising determining the value of the first force contribution and determining the value of the second force contribution representative of the parking braking of the vehicle to be applied being executed by the data processing unit in a continuous manner so as to have the estimate of the determined values always updated according to pressure variations and on a basis of the application step.

7. The method of claim 4, further comprising determining the value of the second force contribution representative of the parking braking of the vehicle applied by the second electromechanical actuator on the first brake disc, according to quantities which can be detected by the data processing unit being executed to always have an updated control.

* * * * *